(12) United States Patent
Saado (10) Patent No.: US 7,376,152 B2
(45) Date of Patent: May 20, 2008

(54) METHOD AND/OR ARCHITECTURE IMPLEMENTED IN HARDWARE FOR THE ADJUSTMENT OF MESSAGES WITH INDETERMINISTIC LENGTH

(75) Inventor: Alon Saado, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 833 days.

(21) Appl. No.: 10/812,810

(22) Filed: Mar. 30, 2004

(65) Prior Publication Data

US 2005/0220151 A1    Oct. 6, 2005

(51) Int. Cl.
*H04J 3/24* (2006.01)
*H04J 3/06* (2006.01)

(52) U.S. Cl. .................................. 370/474; 370/509

(58) Field of Classification Search ................ 370/509, 370/520, 514, 513, 465, 474; 375/366, 369
See application file for complete search history.

(56) References Cited

U.S. PATENT DOCUMENTS

| 4,344,180 A | * | 8/1982 | Cummiskey | ................ | 375/368 |
| 5,710,774 A | * | 1/1998 | Suh et al. | .................. | 370/513 |
| 7,254,206 B2 | * | 8/2007 | Chiang | ....................... | 375/371 |

* cited by examiner

*Primary Examiner*—Andrew C. Lee
(74) *Attorney, Agent, or Firm*—Christopher P. Maiorana, PC (57) ABSTRACT

An apparatus comprising a first circuit and a second circuit. The first circuit may be configured to generate a data output signal in response to a data input signal, a valid word signal, and a select signal. The second circuit may be configured to generate the select signal in response to the valid word signal, a start of frame signal, and end of frame signal and the data output signal. The select signal may adjust a starting point of each of the words to match a starting point of the first word.

12 Claims, 6 Drawing Sheets

(CONVENTIONAL)

METHOD AND/OR ARCHITECTURE IMPLEMENTED IN HARDWARE FOR THE ADJUSTMENT OF MESSAGES WITH INDETERMINISTIC LENGTH

FIELD OF THE INVENTION

The present invention relates to data transmission generally and, more particularly, to a method and/or architecture implemented in hardware for the adjustment of messages with indeterministic length.

BACKGROUND OF THE INVENTION

In conventional data transmission systems, a frame of data may contain several messages with indeterministic length. Usually, a message contains a header and a data block. The length of the data block can be obtained by decoding one or more bits in the header. In order to process each message, the header is processed first. After decoding the header information, such as the message type and length, the data block can be read and processed.

Figure 1:
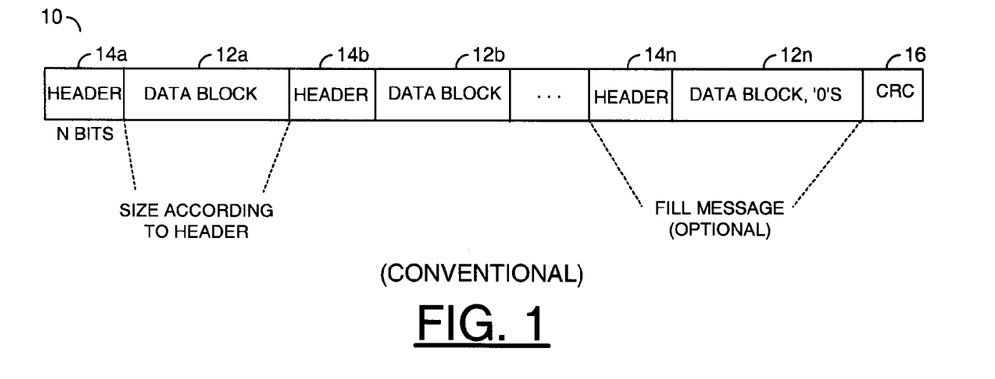
FIG. 1 is a diagram illustrating a frame having a data block of indeterministic length.

Referring to FIG. 1, an example of a frame 10 illustrating several messages is shown. The messages of the frame 10 have an indeterministic length illustrated as the data blocks 12a-12n. A number of headers 14a-14n are shown before each of the data blocks 12a-12n. A cyclical redundancy check (CRC) section 16 is shown after the last data block 12n.

The location of the first bit of the first header 14a is known. Normally, the header 14a starts at the MSB (most significant bit) of the first word, or at the LSB (least significant bit) of the first word. Since the length of the first data block 12a is indeterministic, the first bit of the next header (e.g., 14b) can start anywhere within a word. For example, if the data is supplied as 16-bit words, and the first message length (i.e., one header and one data block) is 274 bits, the next header will start at bit 14 (when the header starts at the MSB) or bit 3 (when the header starts at the LSB). Using conventional approaches, the header starts from a known location to be decoded. After decoding the header, the data block can be processed.

When the data of a message within a frame is read and processed by software, the data is first shifted so the header is in a known location. The software can then decode the header, get the length and other information, and process the data. Implementing a similar method in hardware uses a shift register and associated control logic.

Processing messages with indeterministic length using conventional approaches uses a large amount of shifting and preprocessing. Such shifting and preprocessing increases the processing consumption (e.g., millions of instructions per second, or MIPS) and can create problems, especially when the data rate is high and the frame size is large.

It would be desirable to implement in hardware, a method and/or apparatus to adjust the data messages that minimizes shift operations.

SUMMARY OF THE INVENTION

The present invention concerns an apparatus comprising a first circuit and a second circuit. The first circuit may be configured to generate a data output signal in response to a data input signal comprising a series of words, a valid word signal, and a select signal. The second circuit may be configured to generate the select signal in response to the valid word signal, a start of frame signal, an end of frame signal and the data output signal. The select signal may adjust a starting point of each of the words to match a starting point of the first word.

The objects, features and advantages of the present invention include providing a method and/or apparatus that may (i) adjust messages with indeterministic length, (ii) be implemented in hardware, and/or (iii) minimize shift operations.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

A frame of data may contain several messages with indeterministic length. The start of the first message is normally known. Because of the indeterministic length of each subsequent message, the next messages can start in any bit within a particular word. Processing a message normally starts at the same start point in every message. The present invention may adjust the beginning of a number of subsequent messages to the same start point as the first message.

When processing a message in software, having each message at the same start point saves shift operations, and makes the processing of the data faster and more efficient. Implementing such a shift in hardware may consume a large number of gates.

Figure 2:
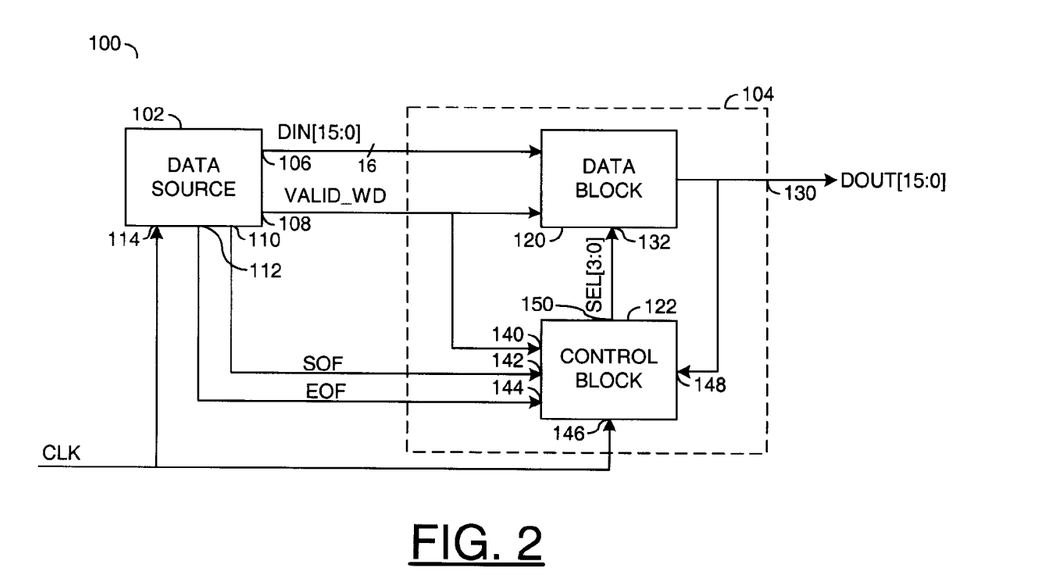
FIG. 2 is a block diagram of a preferred embodiment of the present invention.

Referring to FIG. 2, a diagram of a circuit 100 illustrating a preferred embodiment of the present invention is shown. The circuit 100 generally comprises a block (or circuit) 102 and a block (or circuit) 104. The block 102 may be a data source. The block 104 may be implemented as a processing block configured to process data received from the data source 102. The data source 102 may have a first output 106 that may present a data signal (e.g., DIN[15:0]) and an output 108 that may present an indication signal of a new valid word (e.g., VALID_WD). The data source block 102 may also have an output 110 that may present a start of frame signal (e.g., SOF) and an output 112 that may present an end of frame signal (e.g., EOF). The data source may have an input 114 that may receive a clock signal (e.g., CLK).

The circuit 104 generally comprises a data block (or circuit) 120 and a control block (or circuit) 122. The data block 120 may have an output 130 that may present an output signal (e.g., DOUT[15:0]) and an input 132 that may receive a select signal (e.g., SEL[3:0]). The control block 122 may have an input 140 that may receive the signal VALID_WD, an input 142 that may receive the signal SOF, and an input 144 that may receive the signal EOF. The control block 122 may also have an input 146 that may receive a clock signal CLK and an input 148 that may receive the signal DOUT. The control block 122 may also have an output 150 that may present the signal SEL. In the example shown, each word of the data signal DIN is shown having 16-bits. However, other bit widths may be implemented to meet the design criteria of a particular implementation. Similarly, the select signal SEL is shown as a 4-bit signal. However, other bit widths may be implemented to meet the design criteria of a particular implementation.

The data source 102 (usually a decoder) generally indicates the start of frame (SOF) by presenting a pulse in the signal SOF. A frame of data may contain several messages with indeterministic length. The frame is normally divided into words. When a new word is valid, the signal VALID_WD is active, and the data is captured in the data unit. The data block 120 normally stores two consecutive words. The select signal SEL [3:0] generally controls the adjustment of the data so the header always starts from the same bit. Starting the header from the same bit may simplify data processing.

The data source 102 may present the signal DIN as a series of words. The signal VALID_WD may be implemented as a pulse configured to indicate when a new data word is ready on the signal DIN. The signal SOF may generate a pulse configured to indicate a start of frame. The signal EOF may generate a pulse configured to indicate the last valid word or end of frame.

Figure 3:
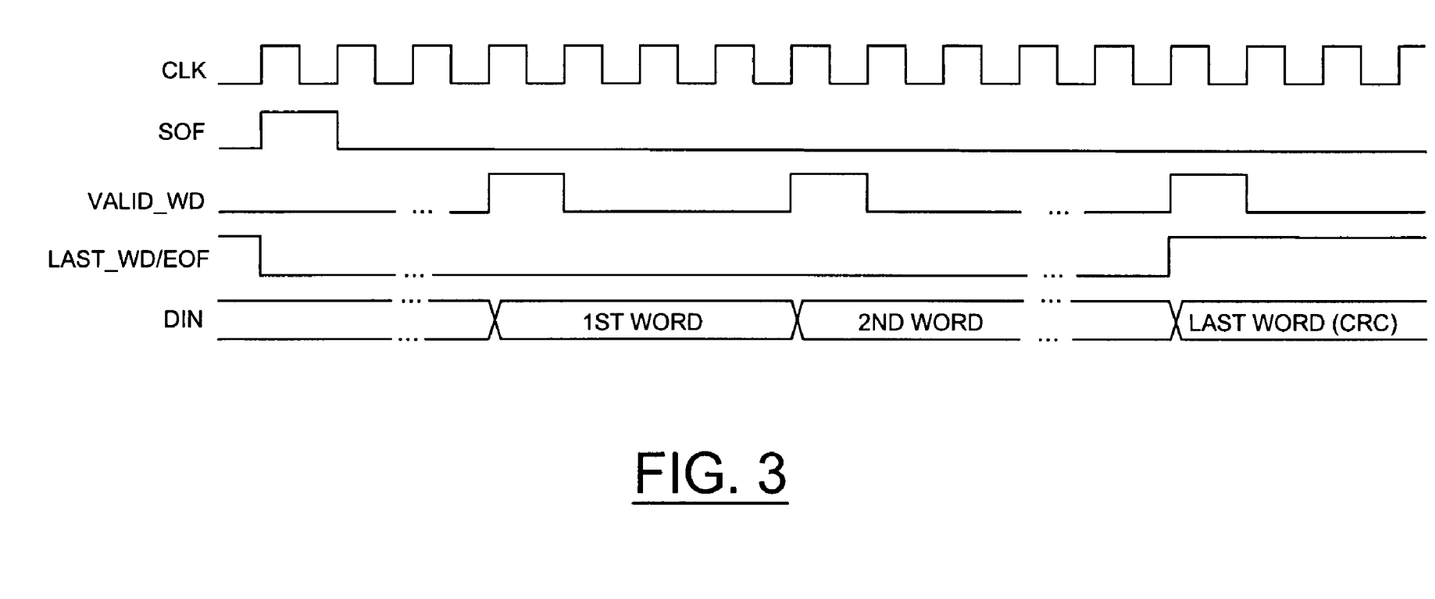
FIG. 3 is a timing diagram illustrating the signals of FIG. 2.

Referring to FIG. 3, a timing diagram illustrating the signals presented by the data source 102 is shown. For purposes of description, the word size may be referred to as 16-bit word. However, the present invention may be implemented to handle other word sizes. The data source 102 (usually a decoder) generally indicates the start of frame (SOF) by presenting a pulse in the signal SOF, a new valid word by presenting a pulse in the signal VALID_WD and the end of frame (EOF) by asserting the signal EOF. The number of clock cycles between pulses of the signal VALID_WD should be sufficient to allow for processing a word and storage of all or part of the bits of the word.

Figure 4:
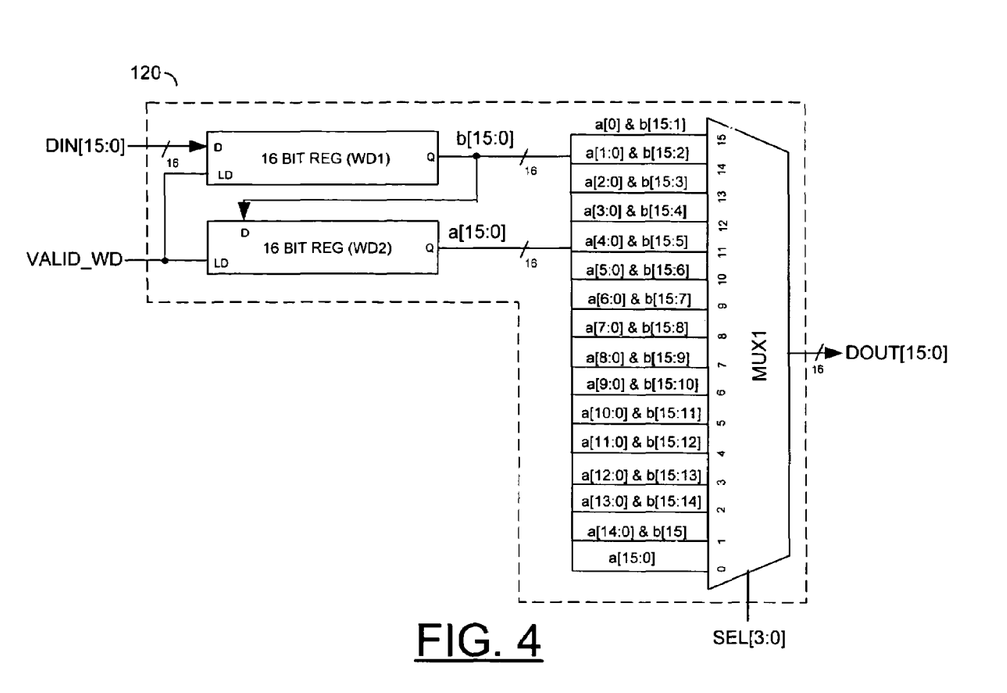
FIG. 4 is a detailed diagram of the data unit illustrating a case where the header starts at the most significant bit.

Referring to FIG. 4, a more detailed diagram of the data block 120 is shown for a case where the header starts at the MSB. After the control block 122 updates the signal SEL[3:0] at the end of a message, a new header starts from bit DOUT[15].

Figure 5:
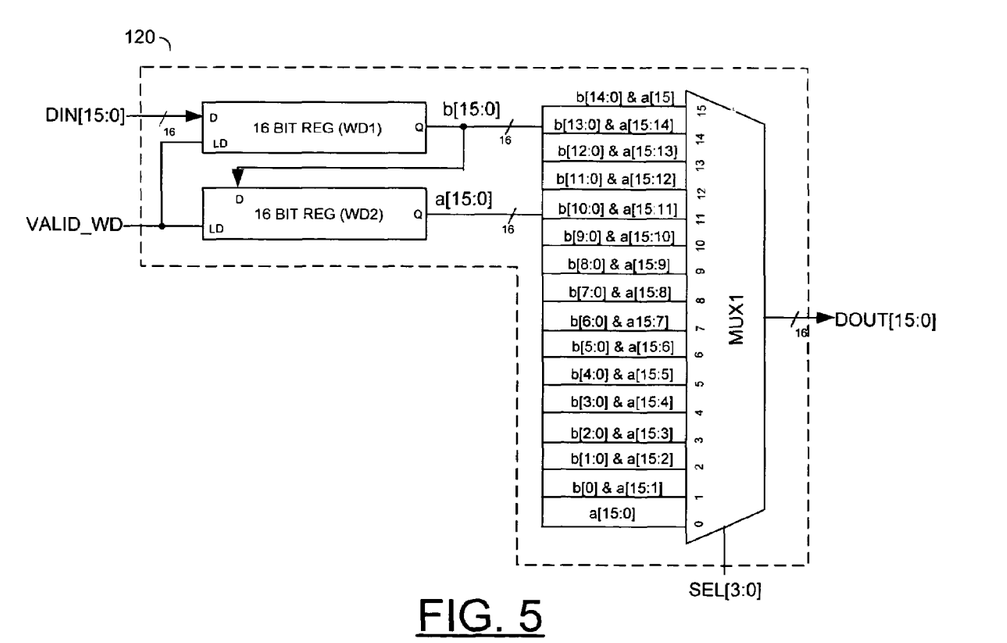
FIG. 5 is a detailed diagram of the data unit illustrating a case where the header starts at the least significant bit.

Referring to FIG. 5, an example of the data block 120 is shown where the header starts at the LSB. After the control block 122 updates the signal SEL[3:0] (at the end of a message) a new header starts from bit DOUT[0]. The data unit 120 generally comprises a register WD1, a register WD2, and a multiplexer MUX1. The registers WD1 and WD2 may be implemented as 16-bit registers (for the example of 16-bit word) configured to store two consecutive words. When the signal VALID_WD is active, a new word is stored in the register WD1. The previous word is stored in the register WD2. The register WD1 presents an output (e.g., B). The register WD2 presents an output (e.g., A). The multiplexer MUX1 generally receives the signals A and B. A combination of bits from the two words selected in response to the signal SEL[3:0] may be used to generate the signal DOUT[15:0].

In the beginning of every frame, the select signal SEL[3:0] is normally zero. The header starts from the LSB or the MSB of the word. When one message is finished, the control block 122 updates the select signal SEL[3:0]. If the select signal SEL[3:0] is zero, the next header is already in the start point and no adjustment is needed. If the select signal SEL[3:0] is not zero, part of the word stored in the register WD1 and part of the word stored in the register WD2 may be used to form a new word. The new header starts from the MSB or the LSB of the word as the first header. The same combination of bits from the word stored in the register WD1 and the word stored in the register WD2 is presented until the end of the message. The select signal SEL[3:0] may be updated again before processing the following message.

Figure 6:
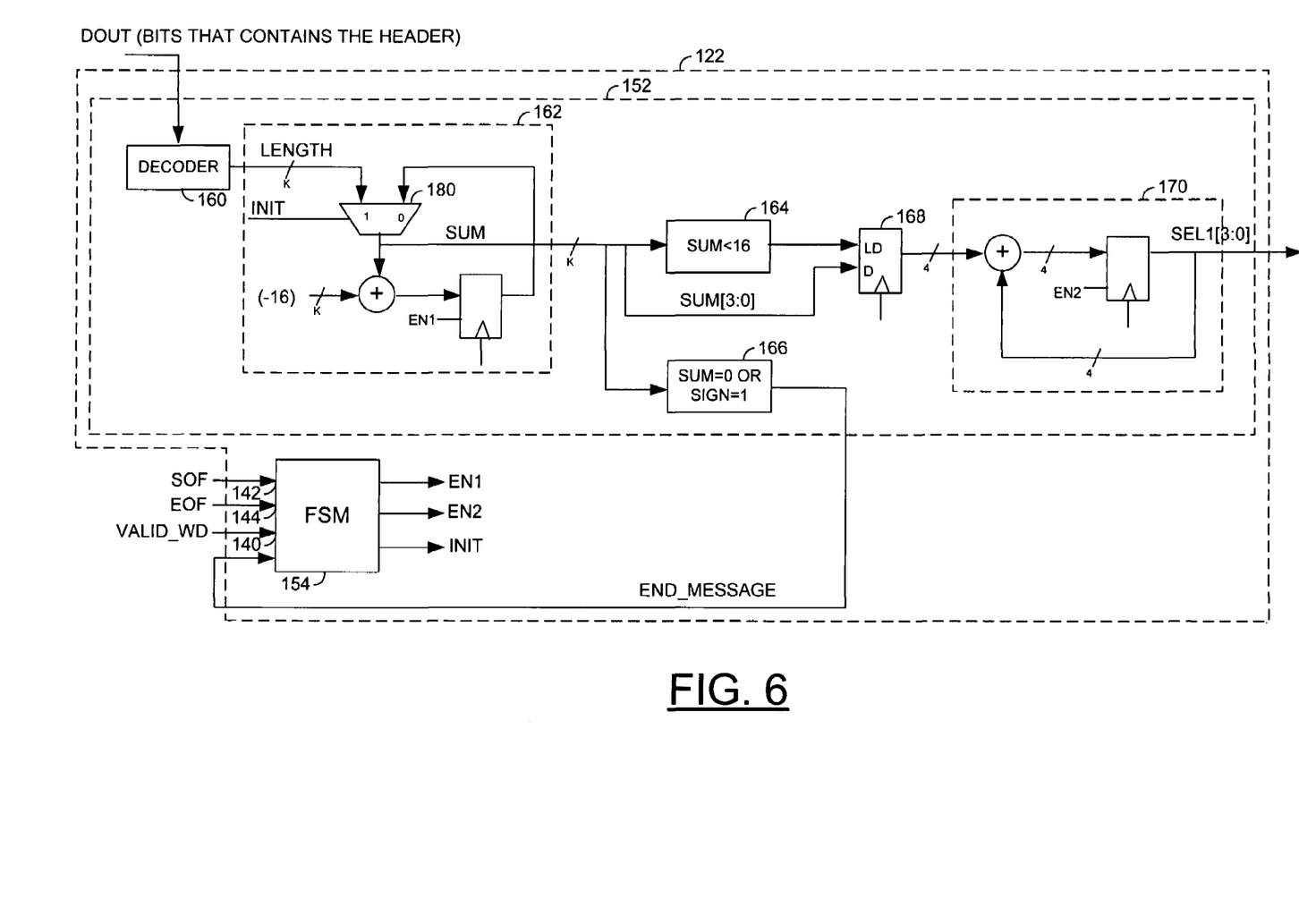
FIG. 6 is a detailed diagram of the control unit logic.

Referring to FIG. 6, an example implementation of the control block 122 is shown. The control block 122 may be implemented as control logic. The control block 122 contains a Finite State Machine (FSM) 154 and a control logic 152. The control logic 152 generally comprises a decoder 160, a subtractor 162, a comparator 164, a comparator 166, a storage element 168 and an adder 170. The control logic 152 generally receives one or more control signals (e.g., EN1, EN2, INIT, etc.) from the state machine 154. The control logic 152 generates the select signal SEL[3:0] that is generally presented to the data block 120.

Figure 7:
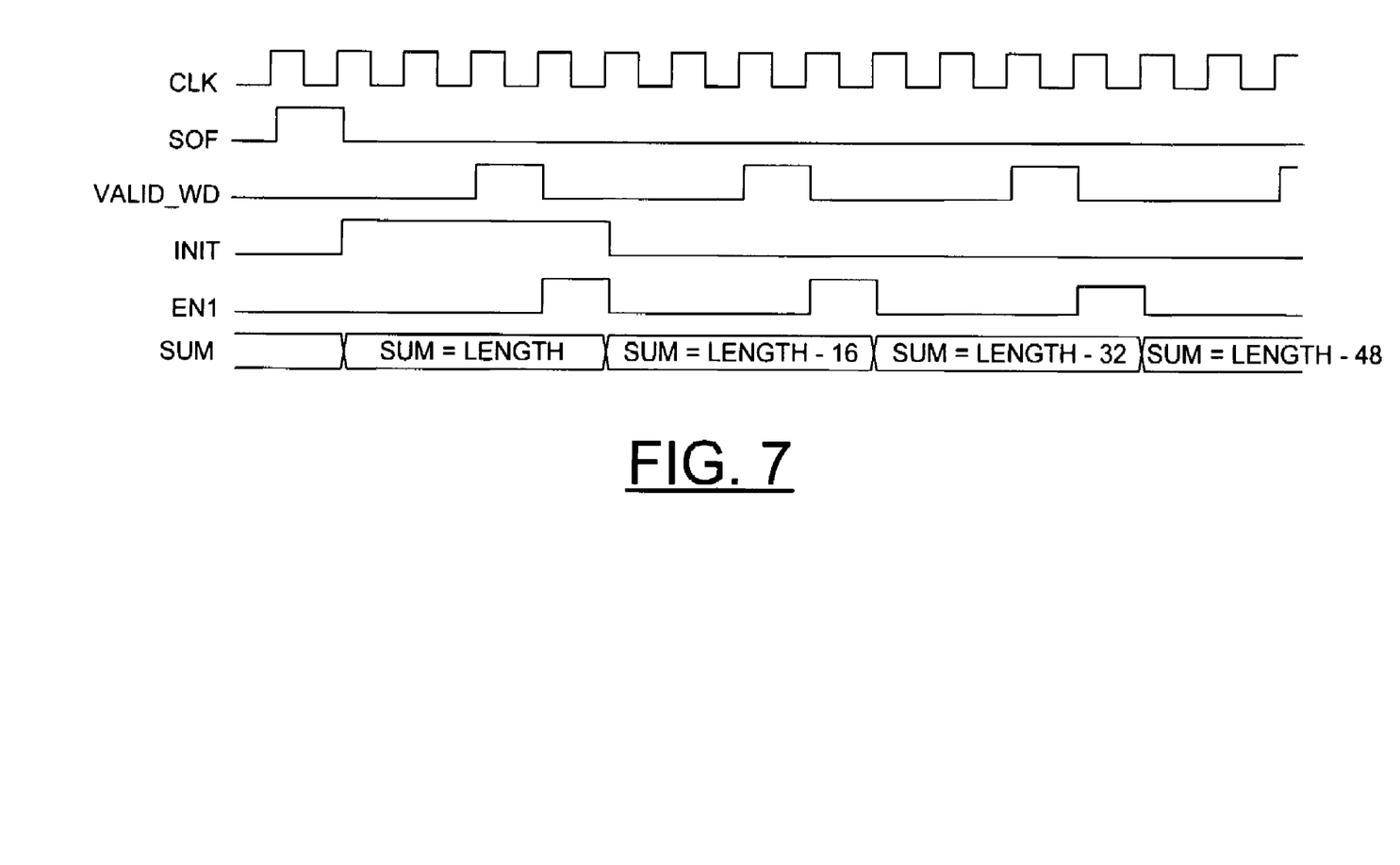
FIG. 7 is a timing diagram illustrating the various signals of the control unit.

Referring to FIG. 7, a timing diagram illustrating the various signals of FIG. 6 is shown. In the beginning of each message, the signal INIT is normally active. The header is decoded, and the length is supplied to a multiplexer 180. The length may or may not include the header length. When there is a new word from the data source, the signal EN1 is active, and the signal SUM is generally equal to the initial length minus 16. The signal INIT is then normally deasserted after a word length (e.g., 16) is subtracted from the initial message length. After that, every time a new word is supplied by the data source 102, the signal EN1 is active for one cycle, and the signal SUM is updated.

When the signal SUM is less than 16 (e.g., between 0 and 15), the four LSBs of the signal SUM are stored. Before processing a new message, the signal EN2 is active, and the select signal SEL[3:0] is updated. The select signal SEL[3:0] is the signal SUM of the previous shift (i.e., previous value of the signal SEL[3:0]) and the current calculated shift. For example, if the first message has 274-bits, after receiving 17 words, the signal SUM is equal to 2 and the signal SEL[3:0] is equal to 2. The next header starts at the third bit (e.g., bit 14 or bit 2). If the next message has 100-bits, after receiving 6 words, the signal SUM is 4. In the beginning of a new message, the signal SEL[3:0] is equal to 6 (e.g., 2+4). The third message starts at the seventh bit (as shown in FIG. 4 and FIG. 5).

When the signal SUM is zero (or a negative number), the signal END_MESSAGE presented to the state machine 154 is asserted. The state machine 154 starts to process a new message, and supplies the control signals EN1, EN2 and INIT. When the end of frame signal EOF is asserted, after processing the last word, the state machine 154 moves to an idle state.

Figure 8:
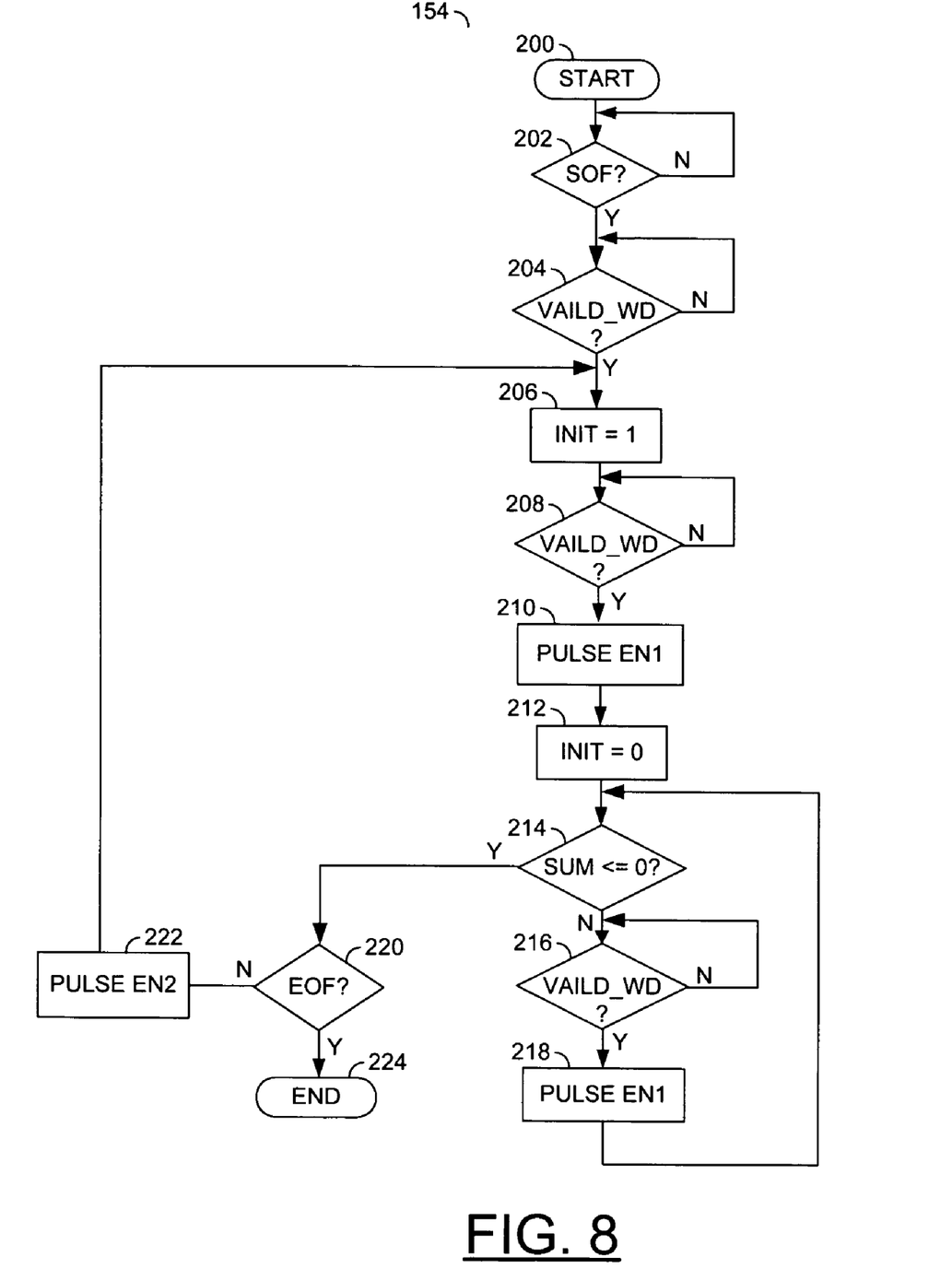
FIG. 8 is a state diagram of the finite state machine of FIG. 6.

Referring to FIG. 8, a flowchart of the state machine 154 is shown. The state machine 154 may be implemented as a method or process. The state machine 154 supplies the control signals EN1, EN2 and INIT to the control logic 152. The state machine 154 generally comprises a state 200, a decision state 202, a decision state 204, a state 206, a decision state 208, a state 210, a state 212, a decision state 214, a decision state 216, a state 218, a decision state 220, a state 222, and an end state 224. The state 200 is a start state that begins the execution of the state machine 154. The decision state 202 determines if a start of frame is present. If not, the decision state 202 continues to check for a start of frame. If a start of frame is present, the state machine 154 moves to the decision state 204. The decision state 204 determines if the signal VALID_WD is active. If not, the state machine 154 continues to check the state of the signal VALID_WD. If the signal VALID_WD is active, the state machine 154 moves to the state 206. The state 206 sets the control signal INIT to an active (or asserted) state (e.g., equal to 1). Next, the state 208 determines if the signal VALID_WD is asserted. If not, the decision state 208 continues to check the signal VALID_WD. If the signal VALID_WD is asserted, the state machine 154 moves to the state 210. The state 210 initiates a pulse on the control signal EN1. Next, the state 212 sets the signal INIT to an inactive (or deasserted) state (e.g., equal to 0). Next, the state 214 determines if the signal SUM is less than or equal to zero. If not, the state machine 154 moves to the state 216. If so, the state machine 154 moves to the state 220.

The state 216 determines if the signal VALID_WD is asserted. If not, the state 216 continues to check the status of the signal VALID_WD. If so, the state machine 154 moves to the state 218 which initiates a pulse on the signal EN1. After the state 218, the state machine 154 moves back to the decision state 214. If the decision state 214 determines that the signal SUM is less than or equal to zero, the state machine 154 moves to the state 220. The state 220 determines if the signal EOF is asserted. If so, the state machine 154 ends with the state 224. If not, the state machine 154 moves to the state 222, which initiates a pulse on the signal EN2. After the state 222, the state machine 154 moves back to the state 206.

The present invention may be used to adjust the beginning of each message to a known location, which is needed for processing a message with indeterministic length. When processing a message in software, having each message at the same start point saves shift operations and make the processing of the data faster and more efficient. Avoiding use of shift commands in software save MIPS. The present invention is efficient in gate count when compared to conventional approaches that may be used to adjust the beginning of indeterministic messages (e.g., shift registers). The present invention may be easily implemented to adjust messages with any word size.

The present invention may be used to control the adjustment, and place the beginning of each message in any desired location (e.g., the start bit does not have to be the MSB or LSB of the word). Such an adjustment may be done by adding an offset to the signal SEL[3:0].

The function performed by the state machine 154 of FIG. 8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
 a first circuit configured to generate a data output signal in response to (i) a data input signal comprising a series of words, (ii) a valid word signal, and (iii) a select signal; and
 a second circuit configured to generate said select signal in response to (i) said valid word signal, (ii) a start of frame signal, (iii) an end of frame signal and (iv) said data output signal, wherein (a) said select signal adjusts a starting point of each of said words to match a starting point of said first word and (b) said second circuit comprises (i) a decoder configured to present a length signal in response to said data output signal, (ii) a subtractor configured to present a sum signal in response to said length signal and a first enable signal and (iii) an adder circuit configured to generate said select signal in response to said sum signal.

2. The apparatus according to claim 1, wherein said second circuit generates said select signal in further response to a clock signal.

3. The apparatus according to claim 1, wherein said first circuit comprises a data circuit and said second circuit comprises a control circuit.

4. The apparatus according to claim 1, wherein said first circuit comprises:
 a first and a second register configured to arrange one or more bits of said data input signal; and
 a multiplexer circuit configured to present said data output signal in response to said arranged bits.

5. The apparatus according to claim 4, wherein said second register includes a data input configured to receive an output of said first register.

6. The apparatus according to claim 4, wherein said first register and said second register are configured to receive said valid word signal.

7. The apparatus according to claim 1, wherein said data input signal, said valid word signal, said start of frame signal and said end of frame signal are received from a data source.

8. The apparatus according to claim 1, wherein said second circuit further comprises a finite state machine configured to control said subtractor and said adder.

9. The apparatus according to claim 8, wherein said second circuit further comprises:
 a sum circuit configured to process said sum signal before said adder circuit generates said select signal.

10. The apparatus according to claim 9, wherein said sum circuit presents an end message signal to said finite state machine.

11. A method for adjusting messages in hardware comprising:
(A) generating a data output signal in response to (i) a data input signal comprising a series of words, (ii) a valid word signal, and (iii) a select signal; and
(B) generating said select signal in response to (i) said valid word signal, (ii) a start of frame signal, (iii) an end of frame signal and (iv) said data output signal, wherein (a) said select signal adjusts a starting point of each of said words to match a starting point of said first word and said method generates said select signal using (i) a decoder configured to present a length signal in response to said data output signal, (ii) a subtractor configured to present a sum signal in response to said length signal and a first enable signal and (iii) an adder circuit configured to generate said select signal in response to said sum signal.

12. An apparatus comprising:
means for generating a data output signal in response to (i) a data input signal comprising a series of words, (ii) a valid word signal, and (iii) a select signal; and
means for generating said select signal in response to (i) said valid word signal, (ii) a start of frame signal, (iii) an end of frame signal and (iv) said data output signal, wherein (a) said select signal adjusts a starting point of each of said words to match a starting point of said first word and said apparatus generates said select signal using (i) a decoder configured to present a length signal in response to said data output signal, (ii) a subtractor configured to present a sum signal in response to said length signal and a first enable signal and (iii) an adder circuit configured to generate said select signal in response to said sum signal.

* * * * *